(12) United States Patent
Zhang et al.

(10) Patent No.: US 12,387,049 B2
(45) Date of Patent: Aug. 12, 2025

(54) SEMANTIC AWARE HALLUCINATION DETECTION FOR LARGE LANGUAGE MODELS

(71) Applicant: Intuit Inc., Mountain View, CA (US)

(72) Inventors: Jiaxin Zhang, Mountain View, CA (US); Kamalika Das, Saratoga, CA (US); Sricharan Kallur Palli Kumar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 233 days.

(21) Appl. No.: 18/240,247

(22) Filed: Aug. 30, 2023

(65) Prior Publication Data

US 2025/0077777 A1    Mar. 6, 2025

(51) Int. Cl.
*G06F 40/30*    (2020.01)
*G06F 40/40*    (2020.01)

(52) U.S. Cl.
CPC ............. *G06F 40/30* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 2023/0161972 A1* | 5/2023 | Härmä | G06F 40/56 704/9 |
| 2024/0202452 A1* | 6/2024 | Schillace | G06N 3/0475 |
| 2024/0378196 A1* | 11/2024 | Lester | G06N 20/00 |
| 2024/0411981 A1* | 12/2024 | Braddy | G06F 8/30 |

\* cited by examiner

*Primary Examiner* — Nafiz E Hoque
(74) *Attorney, Agent, or Firm* — Paradice and Li LLP (57) ABSTRACT

Systems and methods are disclosed for detecting hallucinations in large language models (LLMs). An example method includes receiving a first prompt for submission to the first LLM, generating, using the first LLM, a plurality of semantically equivalent prompts to the first prompt, generating, using the first LLM, a first response to the first prompt and a plurality of second responses to the plurality of semantically equivalent prompts, generating, using a second LLM, a plurality of third responses to the semantically equivalent prompts, generating a semantic consistency score for the first response based at least in part on the first prompt, the plurality of semantically equivalent prompts, the plurality of second responses, and the plurality of third responses, and determining whether or not the first response is an accurate response to the first prompt based at least in part on the semantic consistency score.

20 Claims, 6 Drawing Sheets

SEMANTIC AWARE HALLUCINATION DETECTION FOR LARGE LANGUAGE MODELS

TECHNICAL FIELD

This disclosure relates generally to the management of large language models (LLMs), and more specifically to the characterization of the accuracy of responses generated by such LLMs.

DESCRIPTION OF RELATED ART

A generative artificial intelligence (AI) model is a model that is trained to generate content based on prompts to the model. Generative AI models operating on text prompts and generating text content based on such prompts may be referred to as large language models, or LLMs. One popular LLM is ChatGPT® from OpenAI®. The ChatGPT model receives a user input requesting a text output from the model, and the ChatGPT model generates and outputs text based on the user input. While ChatGPT is one example LLM, various other LLMs exist and are in development, such as InstructGPT, GPT-4, Google® Bard, and so on. Such LLMs may be referred to as a question and answer model, where the model is provided a natural language question and the model generates a natural language answer to the question.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of this disclosure can be implemented as a computer-implemented method for identifying hallucinations in responses generated by a first large language model (LLM). An example method may be performed by a computing device coupled to the first LLM and include receiving a first prompt for submission to the first LLM, generating, using the first LLM, a plurality of semantically equivalent prompts to the first prompt, generating, using the first LLM, a first response to the first prompt, generating a plurality of second responses using the first LLM, each second response generated in response to a semantically equivalent prompt of the plurality of semantically equivalent prompts, generating a plurality of third responses using a second LLM different from the first LLM, each third response generated in response to a semantically equivalent prompt of the plurality of semantically equivalent prompts, generating a semantic consistency score for the first response based at least in part on the first prompt, the plurality of semantically equivalent prompts, the plurality of second responses, and the plurality of third responses, and determining whether or not the first response is an accurate response to the first prompt based at least in part on the semantic consistency score.

In some aspects, generating the plurality of semantically equivalent prompts includes prompting the first LLM to generate a plurality of second prompts which are semantically equivalent to the first prompt, determining, using the first LLM, whether or not each second prompt of the plurality of second prompts is semantically equivalent to the first prompt, and generating the plurality of semantically equivalent prompts to include only the second prompts determined to be semantically equivalent to the first prompt.

In some aspects, the method further includes parsing the first prompt, first response, the plurality of semantically equivalent prompts, the plurality of second responses and the plurality of third responses into a plurality of prompt-response pairs, each prompt-response pair including a prompt and a response generated in response to that prompt, wherein the semantic consistency score is further generated based at least in part on the plurality of prompt-response pairs. In some aspects, the plurality of prompt-response pairs includes a first prompt-response pair including the first prompt and the first response, a plurality of second prompt-response pairs including the plurality of semantically equivalent prompts and corresponding second responses of the plurality of second responses, and a plurality of third prompt-response pairs including the plurality of semantically equivalent prompts and corresponding third responses of the plurality of third responses.

In some aspects, generating the semantic consistency score includes determining a question-level consistency score, determining a model-level cross-check consistency score, and determining a cross-model cross-question consistency score wherein the semantic consistency score is determined based at least in part on the question-level consistency score, the model-level cross-check consistency score, and the cross-model cross-question consistency score. In some aspects, the semantic consistency score includes a weighted sum of the question-level consistency score, the model-level cross-check consistency score, and the cross-model cross-question consistency score. In some aspects, the question-level consistency score, the model-level cross-check consistency score, and the cross-model cross-question consistency score are determined based at least in part on an operator $C(\bullet,\bullet)$ indicating whether or not two prompt-response pairs are semantically equivalent. In some aspects, the operator $C(\bullet,\bullet)$ is determined based on prompting the first LLM to generate a response indicating whether or note the two prompt-response pairs are semantically equivalent.

In some aspects, the question-level consistency score is based at least in part on a predetermined number k of the plurality of semantically equivalent prompts, and on a predetermined number $n_q$ responses of the first LLM to each of the k semantically equivalent prompts. In some aspects, the question-level consistency score is determined as $$\frac{1}{k*n_q} \sum_{i=1}^{n_q} \sum_{j=1}^{k} C(P_0, P_{S_{Tj}}^i),$$

where $P_0$ is a prompt-response pair including the first prompt and the first response, $P_{S_{Tj}}^i$ is a prompt response pair including a j-th prompt of the predetermined number k of semantically equivalent prompts and an i-th sample response of the predetermined number $n_q$ of sample responses to the j-th prompt, and $C(\bullet, \bullet)$ is an operator indicating whether or not two prompt-response pairs are semantically equivalent.

In some aspects, the model-level cross-check consistency score is based at least in part on a predetermined number $n_m$ of sample responses of the second LLM to the first prompt. In some aspects, the model-level cross-check consistency score is determined as $$\frac{1}{n_m}\sum_{i=1}^{n_m} C(P_0, P^i_{S_{V_0}}),$$

where $P_0$ is a prompt-response pair including the first prompt and the first response, $P_{S_{V_0}}^i$ is a prompt response pair including the first prompt and an i-th sample response of the predetermined number $n_m$ of sample responses of the second LLM to the first prompt, and $C(\cdot, \cdot)$ is an operator indicating whether or not two prompt-response pairs are semantically equivalent.

In some aspects, the cross-model cross-question consistency score is based at least in part on a predetermined number k of the plurality of semantically equivalent prompts, and on a predetermined number $n_{qm}$ of sample responses of the second LLM to each of the k semantically equivalent prompts. In some aspects, the cross-model cross-question consistency score is determined as $$\frac{1}{k*n_{qm}}\sum_{i=1}^{n_{qm}}\sum_{j=1}^{k} C(P_0, P^i_{S_{Y_j}}),$$

where $P_0$ is a prompt-response pair including the first prompt and the first response, $P_{S_{V_j}}^i$ is a prompt response pair including a j-th prompt of the predetermined number k of semantically equivalent prompts and an i-th sample response of the predetermined number $n_{qm}$ of sample responses to the j-th prompt, and $C(\cdot,\cdot)$ is an operator indicating whether or not two prompt-response pairs are semantically equivalent.

In some aspects, determining whether or not the first response is an accurate response to the first prompt includes determining that the first response is an accurate response to the first prompt in response to the semantic consistency score exceeding a predetermined threshold.

Another innovative aspect of the present disclosure can be implemented as a system for identifying hallucinations generated by a first large language model (LLM). An example system may include one or more processors and a memory storing instructions for execution by the one or more processors. Execution of the instructions causes the system to perform operations including receiving a first prompt for submission to the first LLM, generating, using the first LLM, a plurality of semantically equivalent prompts to the first prompt, generating, using the first LLM, a first response to the first prompt, generating a plurality of second responses using the first LLM, each second response generated in response to a semantically equivalent prompt of the plurality of semantically equivalent prompts, generating a plurality of third responses using a second LLM different from the first LLM, each third response generated in response to a semantically equivalent prompt of the plurality of semantically equivalent prompts, generating a semantic consistency score for the first response based at least in part on the first prompt, the plurality of semantically equivalent prompts, the plurality of second responses, and the plurality of third responses, and determining whether or not the first response is an accurate response to the first prompt based at least in part on the semantic consistency score.

Another innovative aspect of the present disclosure can be implemented as a computer-implemented method for identifying hallucinations in responses generated by a first large language model (LLM). An example method may include receiving a first prompt for submission to the first LLM, generating, using the first LLM, a plurality of semantically equivalent prompts to the first prompt, generating, using the first LLM, a first response to the first prompt, generating a plurality of second responses using the first LLM, wherein the plurality of second responses includes a predetermined number $n_q$ sample responses generated in response to each semantically equivalent prompt of the plurality of semantically equivalent prompts, generating a plurality of third responses using the second LLM, wherein the plurality of second responses includes a predetermined number $n_{qm}$ sample responses generated in response to each semantically equivalent prompt of the plurality of semantically equivalent prompts, generating a plurality of fourth responses using the second LLM, wherein the plurality of fourth responses includes a predetermined number $n_m$ sample responses generated in response to the first prompt, generating a semantic consistency score for the first response based at least in part on the first prompt, the plurality of semantically equivalent prompts, the plurality of second responses, the plurality of third responses, and the plurality of fourth responses, and determining whether or not the first response is an accurate response to the first prompt based at least in part on the semantic consistency score.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Implementations of the subject matter described in this disclosure may be used for identifying hallucinations in responses generated by a generative artificial intelligence (AI) model. The generative AI models referred to herein are a generative AI model configured to generate a natural language answer to a question provided to the model. Such generative AI models may be referred to as large language models, or LLMs.

Various generative AI models that generate natural language answers are subject to hallucinations. Hallucinations in the context of generative AI models refers to the generations of incorrect responses to prompts. For example, consider a user prompting an LLM or another generative AI model to list five pizza restaurants in a specified town, when only three such restaurants exist. The LLM may provide five responses as instructed, but the extraneous two responses are hallucinations. Hallucinations may result in users receiving and relying on incorrect responses to their prompts, and as such hallucination detection is important when using LLMs.

Conventional hallucination detection techniques may prompt the LLM to generate a plurality of responses to the user's prompt, and to gauge the consistency of the responses, under the assumption that if the LLM consistently produces the same or an equivalent result, then that result is more likely to be accurate rather than a hallucination. However, such techniques may fail to account for the training or prompt generation causing the LLM to be consistently incorrect. It would therefore be desirable to improve the detection of hallucinations in responses generated by generative AI models, such as LLMs.

Various implementations of the subject matter disclosed herein provide one or more technical solutions to the problem of detecting hallucinations in generative AI models. To determine whether a response generated by a first LLM to a user's prompt is a hallucination, the example implementations may generate a set of prompts which are semantically equivalent to the user's prompt and generate a number of responses to the user's prompt and to the semantically equivalent prompt. Further, these responses are generated not only but the first LLM (the "target" LLM), but also by a second LLM (the "verifier" LLM) different from the first LLM. Based on the responses to the user's prompt and the semantically equivalent prompts from both the target LLM and the verifier LLM, a semantic consistency score is calculated, and this semantic consistency score is used to determine how likely it is that the target LLM's response to the user's initial prompt was a hallucination. These and further aspects of the example implementations are discussed in more detail below.

Various aspects of the present disclosure provide a unique computing solution to a unique computing problem that did not exist prior to the creation of machine learning models, and in particular generative AI models. The techniques for determining whether or not a response generated by a generative AI model, such as an LLM, is a hallucination as described herein cannot be performed in the human mind, much less practically in the human mind, including the use of pen and paper. As such, implementations of the subject matter disclosed herein are not an abstract idea such as organizing human activity or a mental process that can be performed in the human mind.

Figure 1:
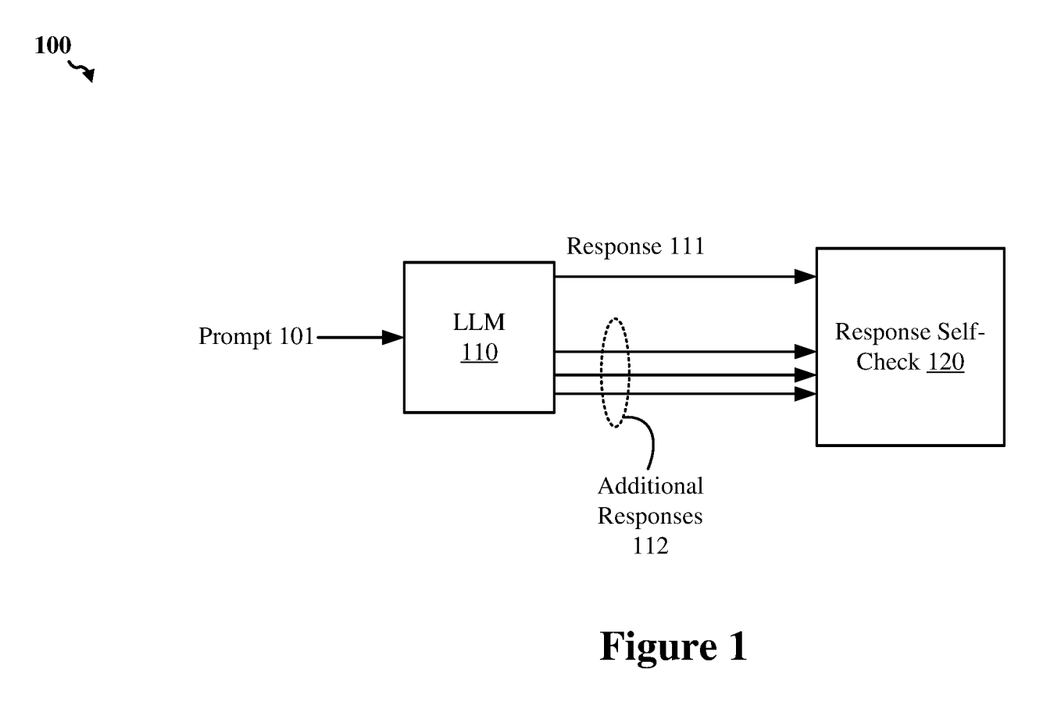
FIG. 1 shows a conventional system for hallucination detection in responses generated by an LLM.

FIG. 1 shows a conventional system 100 for hallucination detection in responses generated by an LLM. A prompt 101 is provided to an LLM 110, and the LLM 110 generates a response 111 to the prompt 101. In addition to generating the response 111, the LLM 110 may generate a plurality of additional responses 112 to the prompt 101. The response 111 and the additional responses 112 may be provided to a response self-check module 120 to determine whether or not the responses are internally consistent. If the responses 112 are equivalent to the response 111, then the system 100 may determine that the response 111 is less likely to be a hallucination than if the responses 112 include a number of responses which are inconsistent with the response 111. For example, the additional response may include $n_s$ additional response to the prompt 101, and a self-check score $Z_{SC^2}$ may be determined as $$\frac{1}{n_s}\sum_{i=1}^{n_s} C(P_0, P_{S_{T0}}^i),$$

where $C(\bullet,\bullet)$ is an operator taking two prompt-response pairs as input and returning a binary output indicating whether the two prompt-response pairs are semantically equivalent, $P_0$ is a prompt-response pair including the prompt 101 and the response 111, and $P_{S_{T0}}^i$ is a prompt-response pair including the prompt 111 and the i-th response of the additional responses 112. For example, $C(\bullet,\bullet)$ may have a value of 0 when two prompt-response pairs are semantically equivalent and 1 when they are not semantically equivalent. In that case a larger value of $Z_{SC^2}$ indicates a higher likelihood that the response 111 is a hallucination. Similarly, if $C(\bullet,\bullet)$ has a value of 1 when two prompt-response pairs are semantically equivalent and 0 when they are not semantically equivalent, then lower values of $Z_{SC^2}$ indicate a higher chance that the response 111 is a hallucination.

As discussed above, the self-check operations described with respect to FIG. 1 have significant limitations, relating both to the construction of the prompt and to the LLM itself. For example, if the prompt 101 is not clearly constructed, then inconsistent or inaccurate responses may be generated. Additionally, if an LLM is consistently inaccurate in its responses, then a self-check will not catch such persistent hallucinations. The example implementations improve hallucination detection relating to both of these limitations by first generating a plurality of prompts which are semantically equivalent to the user's initial prompt, and also by generating response to the user's initial prompt and the plurality of semantically equivalent prompts using an additional LLM.

Figure 2:
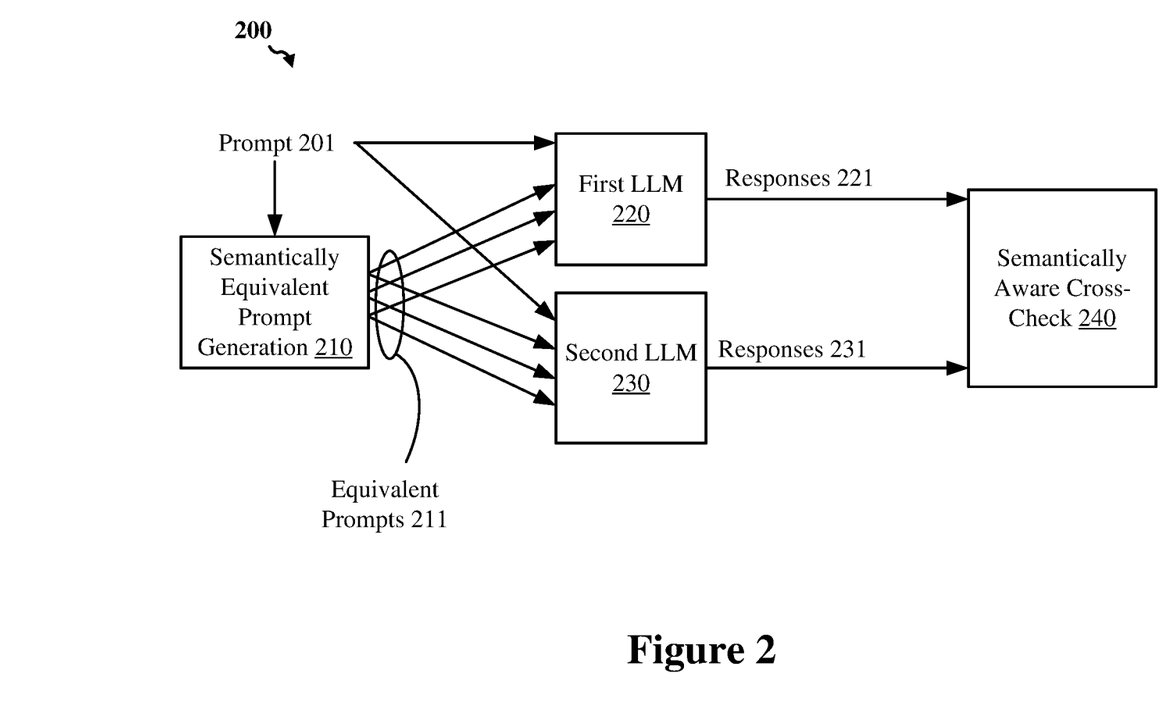
FIG. 2 shows a system for hallucination detection in responses generated by a target LLM, in accordance with example implementations.

FIG. 2 shows a system 200 for hallucination detection in responses generated by a target LLM, in accordance with example implementations. With respect to FIG. 2, a prompt 201 (the "first prompt") may be received for submission to a first LLM for generating a response. The first LLM 220 may be referred to as the "target" LLM. In addition, the prompt 201 is provided to semantically equivalent prompt generation 210 for generating a plurality of semantically equivalent prompts 211. For example, the plurality of semantically equivalent prompts may be generated by the first LLM 220, or by another LLM, by providing the prompt 201 to the first LLM 220 as part of a request to generate the plurality of semantically equivalent prompts 211. In one example, the prompt 201 may be provided to the first LLM 220 in a prompt reading "for the question [prompt 201], provide k semantically equivalent questions," or another similar prompt. In some examples, the k semantically equivalent questions provided in response by the first LLM 220 may also be double-checked by submitting them to the first LLM in a pairwise manner with the prompt 201, such as using the prompt "are the following two inputs semantically equivalent?[prompt 201], [sample equivalent prompt]." In some aspects, if any of the additional prompts generated by the first LLM 220 fail this double-check, they may be removed from the plurality of semantically equivalent prompts 211.

The prompt 201 and the plurality of semantically equivalent prompts 211 are then provided to the first LLM 220 and to a second LLM 230. The second LLM 230 is different from the first LLM 220 and may be referred to as the "verifier" LLM. A plurality of responses 221 are generated by the first LLM 220 and a plurality of response 231 are generated by the second LLM 230 to the prompt 201 and to the plurality of semantically equivalent prompts 211, as discussed in more detail below, and then these responses are provided to a semantically aware cross-check module 240, which generates a semantically aware cross-check consistency score $Z_{SC^3}$ indicating whether or not a response to the prompt 201 is likely to be a hallucination.

More particularly, in some aspects, the semantically aware cross-check consistency score may be generated based on several component subscores, where each component subscore captures information about different types of hallucination. In some aspects, the several component subscores may include a question-level consistency score $Z_{SC^3-Q}$, a model-level consistency score $Z_{SC^3-M}$, and a cross-model cross-question consistency score $Z_{SC^3-QM}$. In some aspects, the semantically aware cross-check consistency score $Z_{SC^3}$ is generated based on a weighted sum of the question-level consistency score, the model-level consistency score, and the cross-model cross-question consistency score, such as $Z_{SC^3}=Z_{SC^3-Q}+\lambda(Z_{SC^3-M}+Z_{SC^3-QM})$, where $\lambda$ is a suitable scaling factor, which may have a value of 1 or another suitable value.

In some aspects, the responses 221 and the responses 231 may include all of the responses needed to generate the question-level consistency score, the model-level consistency score, and the cross-model cross-question consistency score, so that these consistency scores may be calculated in parallel. In some aspects, responses used for generating one of the subscores may also be used for generating other subscores. For example, responses used for calculating the model-level consistency score may also be used for calculating the cross-model cross-question consistency score.

In some aspects, generating the question-level consistency score may be determined based on a predetermined number k of the plurality of semantically equivalent prompts 211 and on a predetermined number $n_q$ of responses generated by the target LLM to each of the k semantically equivalent prompts. In some aspects, k may be 10, or another suitable integer, while $n_q$ may be 1, 2, 3, or any other suitable integer. In some examples, the question level consistency score may be generated as $$\frac{1}{k*n_q}\sum_{i=1}^{n_q}\sum_{j=1}^{k} C(P_0, P^i_{S_{Tj}}),$$

where $P_0$ is a prompt-response pair including the first prompt (prompt 201) and the response generated by the first LLM to the first prompt, $P_{S_{Tj}}^i$ is a prompt-response pair including the j-th prompt of the k semantically equivalent prompts, and an i-th response of the $n_q$ responses generated by the target LLM to the j-the prompt.

In some aspects, generating the model-level consistency score is based on a predetermined number $n_m$ of responses generated by the verifier LLM (e.g., the second LLM 230) to the first prompt. In some aspects, $n_m$ may be 1, 2, 3, or any other suitable integer. In some examples, the model-level consistency score is generated as $$\frac{1}{n_m}\sum_{i=1}^{n_m} C(P_0, P^i_{S_{V0}}),$$

where $P_{S_{V0}}^i$ is a prompt-response pair including the first prompt and the i-th sample response of the $n_m$ responses to the first prompt generated by the verifier LLM.

In some aspects, the cross-model cross-question consistency score is generated based on a predetermined number k of the plurality of semantically equivalent prompts 211, and on a predetermined number $n_{qm}$ of sample responses generated by the verifier LLM to each of the k semantically equivalent prompts. In some aspects, $n_{qm}$ may be 1, 2, 3, or any suitable integer. In some examples, the cross-model cross-question consistency score is determined as $$\frac{1}{k*n_{qm}}\sum_{i=1}^{n_{qm}}\sum_{j=1}^{k} C(P_0, P^i_{S_{Vj}}),$$

where $P_{S_{Vj}}^i$ is a prompt-response pair including a j-th prompt of the k semantically equivalent prompts 211 and an i-th sample response of the $n_{qm}$ sample responses generated by the verifier LLM to the j-th prompt.

In some aspects, a response to the prompt 201 is determined not to be a hallucination when the semantically aware cross-check consistency score $Z_{SC^3}$ exceeds a predetermined threshold score.

Applicant has found that use of the semantically aware cross-check consistency score is significantly better at identifying hallucinations than the conventional self-check score $Z_{SC^2}$.

Figure 3:
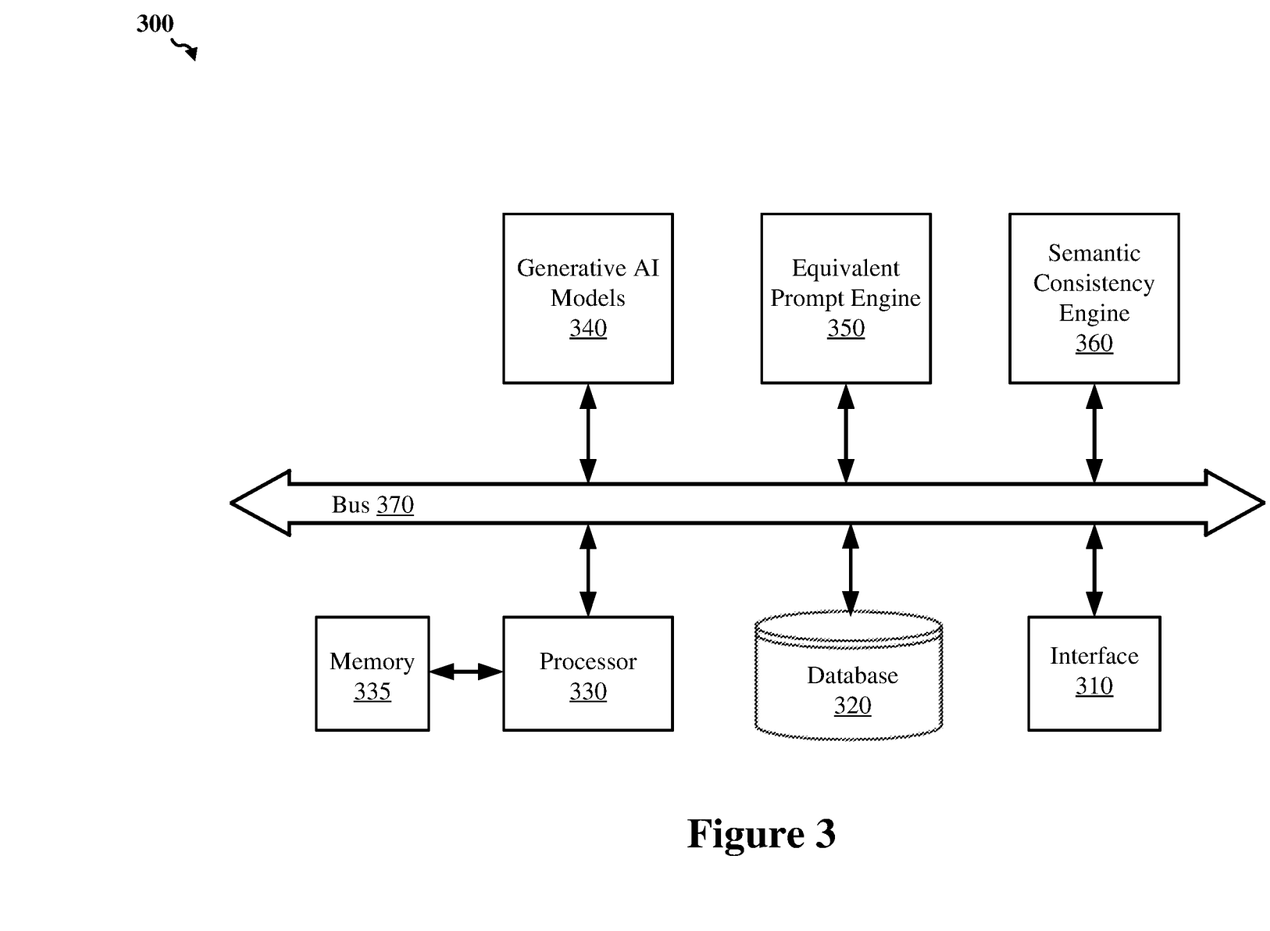
FIG. 3 shows an example system for detecting hallucinations in large language models, according to some implementations.

FIG. 3 shows an example system 300 for detecting hallucinations in large language models, according to some implementations. The system 300 includes an interface 310, a database 320, a processor 330, a memory 335 coupled to the processor 330, two or more generative AI models 340, an equivalent prompt engine 350, and a semantic consistency engine 360. In some implementations, the generative AI models 340 may not be included in the system 300 but may instead be coupled to the system 300, such as via a data bus 370, via a network interface, or similar. In some implementations, the various components of the system 300 may be interconnected by at least the data bus 370, as depicted in the example of FIG. 3. In other implementations, the various components of the system 300 may be interconnected using other suitable signal routing resources.

The interface 310 may be one or more input/output (I/O) interfaces to obtain inputs to one or more generative AI models, provide outputs from one or more generative AI models, provide one or more consistency scores, such as the semantically aware cross-check consistency score or its constituent subscores, or receive or provide inputs or outputs for continued operation of the system 300. An example interface may include a wired interface or wireless interface to the internet or other means to communicably couple with other devices. In some implementations, the interface 310 may include an interface with an ethernet cable or a wireless interface to a modem, which is used to communicate with an internet service provider (ISP) directing traffic to and from other devices (such as a system used by a developer, tester, or other types of users to use the system 300 for a generative AI model 340). If the system 300 is local to a user (such as to an internal developer), the interface 310 may include a display, a speaker, a mouse, a keyboard, or other suitable input or output elements that allow interfacing with the user (such as to provide a prompt to the generative AI models 340, receive questions from the user, provide outputs from the generative AI models 340, receive feedback from the user, and so on).

The database 320 may store prompts submitted to the generative AI models 340, responses generated by the generative AI models 340, or other computer executable instructions or data for operation of the system 300, such as for generating the semantically aware cross-check consistency scores described above, or for gathering the prompts and responses required for generating such scores. In some implementations, the database 320 may include a relational database capable of presenting information as data sets in tabular form and capable of manipulating the data sets using relational operators. For example, the database 320 may store prompt-response pairs, which may be organized in tabular form, for determining the above-described semantic consistency scores. The database 320 may use Structured Query Language (SQL) for querying and maintaining the database 320.

The processor 330 may include one or more suitable processors capable of executing scripts or instructions of one or more software programs stored in system 300 (such as within the memory 335). For example, the processor 330 may be capable of executing one or more applications, any of the one or more generative AI models 340, equivalent prompt engine 350, or the semantic consistency engine 360. The processor 330 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 330 may include a combination of computing devices (such as a combination of a DSP and a microprocessor, a plurality of microprocessors, one or more microprocessors in conjunction with a DSP core, or any other such configuration).

The memory 335, which may be any suitable persistent memory (such as non-volatile memory or non-transitory memory) may store any number of software programs, executable instructions, machine code, algorithms, and the like that can be executed by the processor 330 to perform one or more corresponding operations or functions. For example, the memory 335 may store the one or more applications, any of the two or more generative AI models 340, the equivalent prompt engine 350, or the semantic consistency engine 360 that may be executed by the processor 330. The memory 335 may also store inputs, outputs, or other information associated with the components 340-360 of the system 300 or any other data for operation of the system 300.

The generative AI models 340 include two or more large language models (LLMs) to be used for generating responses to prompts and in connection with detecting hallucinations by the system 300. In some implementations, the generative AI models 340 include two pretrained LLMs for use by the system 300-a target LLM and a verifier LLM. For example, a pretrained LLM (referred to herein simply as an LLM), to the system 300 via the interface 310, and the system 300 stores the LLM for use as either a target LLM or a verifier LLM for identifying hallucinations. In some other implementations, the system 300 may include a repository storing a plurality of LLMs. In this manner, to detect hallucinations in connection with responses generated by a particular one of the plurality of LLMs, the system 300 selects one of the plurality of LLMs in the repository and retrieves the selected LLM from the repository for use as a target LLM or a verifier LLM.

The equivalent prompt engine 350 generates semantically equivalent prompts to a provided input prompt, such as the plurality of semantically equivalent prompts described above in connection with FIG. 2. In some implementations, the semantically equivalent prompts may be generated by the target LLM or the verifier LLM in response to a prompt, such as a prompt reading "for the question [prompt], provide k semantically equivalent questions," or another similar prompt, where "[prompt]" is replaced by the input prompt, and k by the number of semantically equivalent prompts desired. In some examples, the k semantically equivalent questions provided in response to such a prompt may also be double-checked by submitting them to the target LLM or the verifier LLM in a pairwise manner with the input prompt, such as using the prompt "are the following two inputs semantically equivalent?[prompt], [sample equivalent prompt]," or similar, where "[prompt]" is replaced by the input prompt, and "[sample equivalent prompt]" is replaced by one of the generated prompts to be double-checked. In some aspects, if any of the additional prompts generated by the equivalent prompt engine 350 fail this double-check, they may not be used for generating the semantically aware cross-check consistency score generated by the semantic consistency engine 360.

The semantic consistency engine 360 generates a semantically aware cross-check consistency score based on the semantically equivalent prompts generated by the equivalent prompt engine 350 and based on responses to the input prompt and the semantically equivalent prompts generated by the generative AI models 340. For example, semantic consistency engine 360 may generate a question-level consistency score, a model-level cross-check consistency score, and a cross-model cross-question consistency score as discussed above, and generate the semantically aware cross-check consistency score may be generated as discussed above, based on a weighted sum of the question-level consistency score, the model-level cross-check consistency score, and the cross-model cross-question consistency score, as discussed above.

While the generative AI models 340, the equivalent prompt engine 350, and the semantic consistency engine 360 are depicted as separate components of the system 300 in FIG. 3 for clarity, the components 340-360 may be included in software including instructions stored in memory 335 or the database 320. In addition, components of the system 300 may be included in one device, distributed across multiple devices, may be included in fewer components, and so on. If the components are software, the components may be implemented using any suitable computer-readable language. For example, one or more of the generative AI models 340, the equivalent prompt engine 350, and the semantic consistency engine 360, and the configuration and interoperability of such components, may be programmed in the Python programming language using any suitable libraries.

Figure 4:
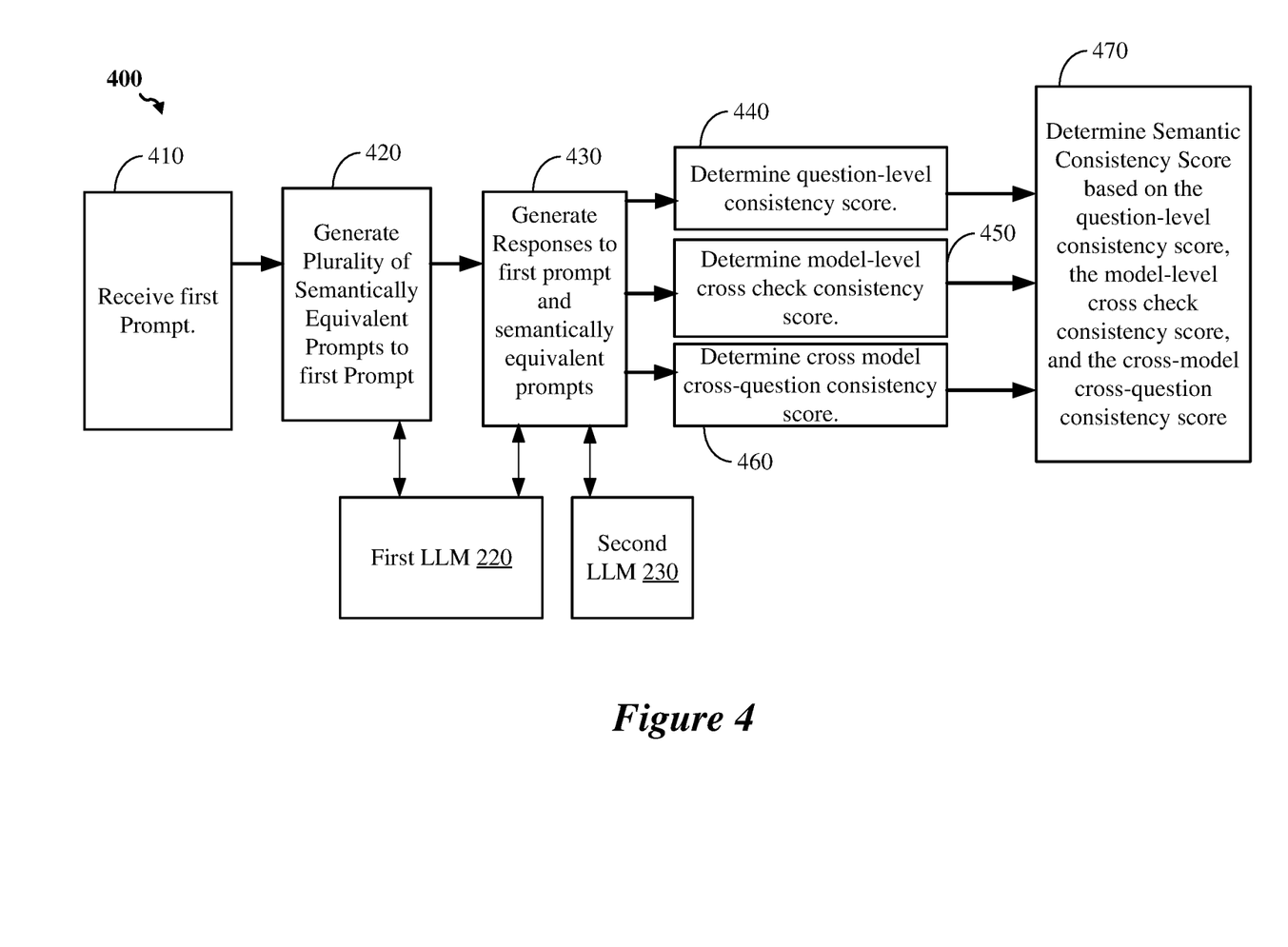
FIG. 4 shows a high-level overview of an example process flow that may be employed by the system of FIG. 3.

FIG. 4 shows a high-level overview of an example process flow 400 that may be employed by the system 300 of FIG. 3. In block 410, the system 300 receives a first prompt for submission to a first LLM. For example, the first prompt may be received from a user via the interface 310, or be retrieved from a memory, such as the database 320 or another memory contained within or coupled to the system 300. In block 420, the system 300 may generate a plurality of semantically equivalent prompts to the first prompt. For example, as discussed above, the plurality of semantically equivalent prompts may be generated in response to a suitable prompt submitted to the first LLM 220 and may be generated in some examples by semantically equivalent prompt generation module 210 of FIG. 2 or the equivalent prompt engine 350 of FIG. 3. In some examples, the plurality of semantically equivalent prompts may include 10 semantically equivalent prompts. In block 430, system 300 may generate responses to the first prompt and to the semantically equivalent prompts. For example, the responses to the first prompt and the semantically equivalent prompts may be generated by the first LLM 220 and the second LLM 230. In some aspects, as discussed above, these responses may include one response from the first LLM 220 to the first prompt, $n_q$ responses from the first LLM 220 to each semantically equivalent prompt, $n_m$ responses from the second LLM 230 to the first prompt, and $n_{qm}$ responses from the second LLM 230 to each of the semantically equivalent prompts. As discussed above, generating these responses prior to generating the consistency scores may allow the question-level consistency score, the model-level cross-check consistency score, and the cross-model cross-question consistency score to be calculated in parallel. In block 440, the system 300 determines a question-level consistency score. In block 450, the system 300 determines a model-level cross check consistency score. In block 460, the system 300 determines a cross-model cross-question consistency score. In block 470, the system 300 determines a semantic consistency score based on the question-level consistency score, the model-level cross check consistency score, and the cross-model cross-question consistency score. In some aspects, these consistency scores may be determined based on the responses to the first prompt and to the semantically equivalent prompts as discussed above.

While not shown in FIG. 4 for simplicity, a variety of actions may be taken in response to determining that the response to the first prompt is likely to be or not to be a hallucination, based on the semantic consistency score. For example, if the response is determined as likely to be a hallucination, then the response may not be used by one or more downstream software modules. As an example, consider an LLM used to enter data into fields of a form. If a response is determined as likely to be a hallucination, then the response may not be used for entry into a field of the form. As another example, if a response is determined as likely to be a hallucination, an error message or a warning message may be presented to a user who submitted the first prompt, or may be attached to the response to warn potential downstream users. As another alternative, if the response is determined as likely to be a hallucination, then the user may be prompted to enter an alternative prompt. In some aspects, the user may be presented with one or more of the semantically equivalent prompts as an example alternative prompt.

Figure 5:
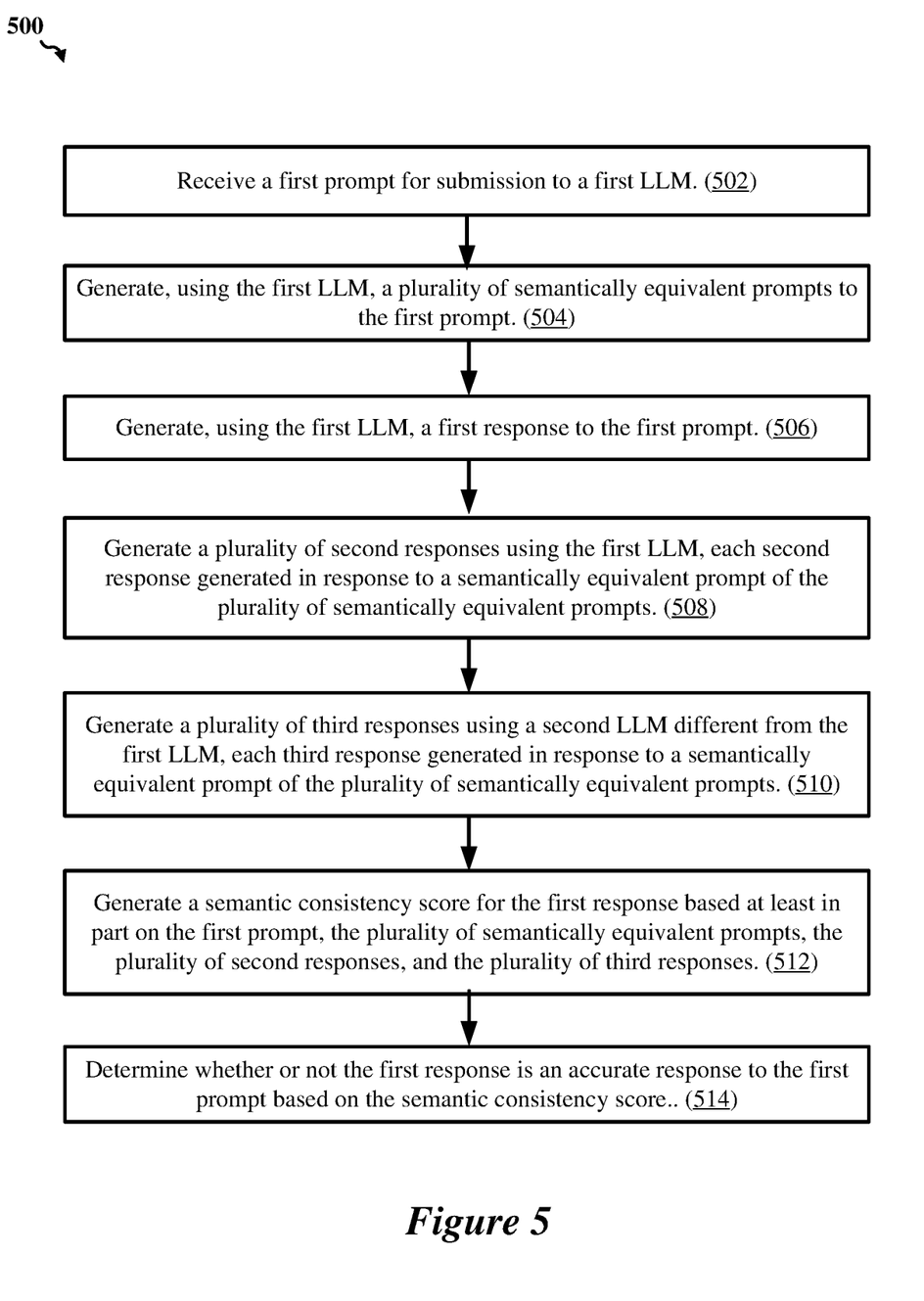
FIG. 5 shows an illustrative flow chart depicting an example operation for identifying hallucinations in responses generated by a first large language model (LLM), according to some implementations.

FIG. 5 shows an illustrative flow chart depicting an example operation 500 for identifying hallucinations in responses generated by a first large language model (LLM), according to some implementations. The example operation 500 is described as being performed by the system 300 depicted in FIG. 3 with reference to the components depicted in FIGS. 2 and 3 for clarity only, and the operation 500 may be performed by any suitable device or system including or coupled to two LLMs.

At block 502, the system 300 receives a first prompt for submission to a first LLM. In some aspects, a means for receiving the first prompt may include the interface 310.

At block 504, the system 300 generates, using the first LLM, a plurality of semantically equivalent prompts to the first prompt. In some aspects, generating the plurality of semantically equivalent prompts includes prompting the first LLM to generate a plurality of second prompts which are semantically equivalent to the first prompt, determining, using the first LLM, whether or not each second prompt of the plurality of second prompts is semantically equivalent to the first prompt, and generating the plurality of semantically equivalent prompts to include only the second prompts determined to be semantically equivalent to the first prompt. In some aspects, a means for generating the plurality of semantically equivalent prompts may include the semantically equivalent prompt generation module 210 or the equivalent prompt engine 350 and the generative AI models 340 and interface 310 of FIG. 3.

At block 506, the system 300 generates, using the first LLM, a first response to the first prompt. In some aspects, a means for generating the first response includes the generative AI models 340 and the interface 310.

At block 508, the system 300 generates a plurality of second responses using the first LLM, each second response generated in response to a semantically equivalent prompt of the plurality of semantically equivalent prompts. In some aspects, a means for generating the plurality of second responses includes the first LLM 220 of FIG. 2, or the generative AI models 340 and interface 310 of FIG. 3.

At block 510, the system 300 generates a plurality of third responses using a second LLM different from the first LLM, where each third response is generated in response to a semantically equivalent prompt of the plurality of semantically equivalent prompts. In some aspects, a means for generating the plurality of second responses includes the second LLM 230 of FIG. 2, or the generative AI models 340 and interface 310 of FIG. 3.

At block 512, the system 300 generates a semantical consistency score for the first response based at least in part on the first prompt, the plurality of semantically equivalent prompts, the plurality of second responses, and the plurality of third responses. In some aspects, a means for generating the semantic consistency score includes the semantically aware cross-check module 240 of FIG. 2 or the semantic consistency engine 360 and interface 310 of FIG. 3.

At block 514, the system 300 determines whether or not the first response is an accurate response to the first prompt based on the semantic consistency score. In some aspects, a means for determining whether or not the first response is an accurate response includes the semantically aware cross-check module 240 of FIG. 2 or the semantic consistency engine 360 and interface 310 of FIG. 3.

In some aspects, the operation 500 further includes parsing the first prompt, first response, the plurality of semantically equivalent prompts, the plurality of second responses and the plurality of third responses into a plurality of prompt-response pairs, each prompt-response pair including a prompt and a response generated in response to that prompt, wherein the semantic consistency score is further generated based at least in part on the plurality of prompt-response pairs. In some aspects, the plurality of prompt-response pairs includes a first prompt-response pair including the first prompt and the first response, a plurality of second prompt-response pairs including the plurality of semantically equivalent prompts and corresponding second responses of the plurality of second responses, and a plurality of third prompt-response pairs including the plurality of semantically equivalent prompts and corresponding third responses of the plurality of third responses.

In some aspects, generating the semantic consistency score in block 512 includes determining a question-level consistency score, determining a model-level cross-check consistency score, and determining a cross-model cross-question consistency score wherein the semantic consistency score is determined based at least in part on the question-level consistency score, the model-level cross-check consistency score, and the cross-model cross-question consistency score. In some aspects, the semantic consistency score is determined as a weighted sum of the question-level consistency score, the model-level cross-check consistency score, and the cross-model cross-question consistency score. In some aspects, the question-level consistency score, the model-level cross-check consistency score, and the cross-model cross-question consistency score are determined based at least in part on an operator C(•,•) indicating whether or not two prompt-response pairs are semantically equivalent. In some aspects, the operator C(•,•) is determined based on prompting the first LLM to generate a response indicating whether or not the two prompt-response pairs are semantically equivalent.

In some aspects, the question-level consistency score is based at least in part on a predetermined number k of the plurality of semantically equivalent prompts, and on a predetermined number $n_q$ responses of the first LLM to each of the k semantically equivalent prompts. In some aspects, the question-level consistency score is determined as $$\frac{1}{k*n_q}\sum_{i=1}^{n_q}\sum_{j=1}^{k}C(P_0, P^i_{S_{Tj}}),$$

wherein $P_0$ is a prompt-response pair including the first prompt and the first response, $P_{S_{Tj}}^i$ is a prompt response pair including a j-th prompt of the predetermined number k of semantically equivalent prompts and an i-th sample response of the predetermined number $n_q$ of sample responses to the j-th prompt, and C(•, •) is an operator indicating whether or not two prompt-response pairs are semantically equivalent.

In some aspects, the model-level cross-check consistency score is based at least in part on a predetermined number $n_m$ of sample responses of the second LLM to the first prompt. In some aspects, the model-level cross-check consistency score is determined as $$\frac{1}{n_m}\sum_{i=1}^{n_m}C(P_0, P^i_{S_{V0}}),$$

where $P_0$ is a prompt-response pair including the first prompt and the first response, $P_{S_{V0}}^i$ is a prompt response pair including the first prompt and an i-th sample response of the predetermined number $n_m$ of sample responses of the second LLM to the first prompt, and C(•, •) is an operator indicating whether or not two prompt-response pairs are semantically equivalent.

In some aspects, the cross-model cross-question consistency score is based at least in part on a predetermined number k of the plurality of semantically equivalent prompts, and on a predetermined number $n_{qm}$ of sample responses of the second LLM to each of the k semantically equivalent prompts. In some aspects, the cross-model cross-question consistency score is determined as $$\frac{1}{k*n_{qm}}\sum_{i=1}^{n_{qm}}\sum_{j=1}^{k}C(P_0, P^i_{S_{Vj}}),$$

where $P_0$ is a prompt-response pair including the first prompt and the first response, $P_{S_{Vj}}^i$ is a prompt response pair including a j-th prompt of the predetermined number k of semantically equivalent prompts and an i-th sample response of the predetermined number $n_{qm}$ of sample responses to the j-th prompt, and C(•,•) is an operator indicating whether or not two prompt-response pairs are semantically equivalent.

In some aspects, determining whether or not the first response is an accurate response to the first prompt in block 514 includes determining that the first response is an accurate response to the first prompt in response to the semantic consistency score exceeding a predetermined threshold.

Figure 6:
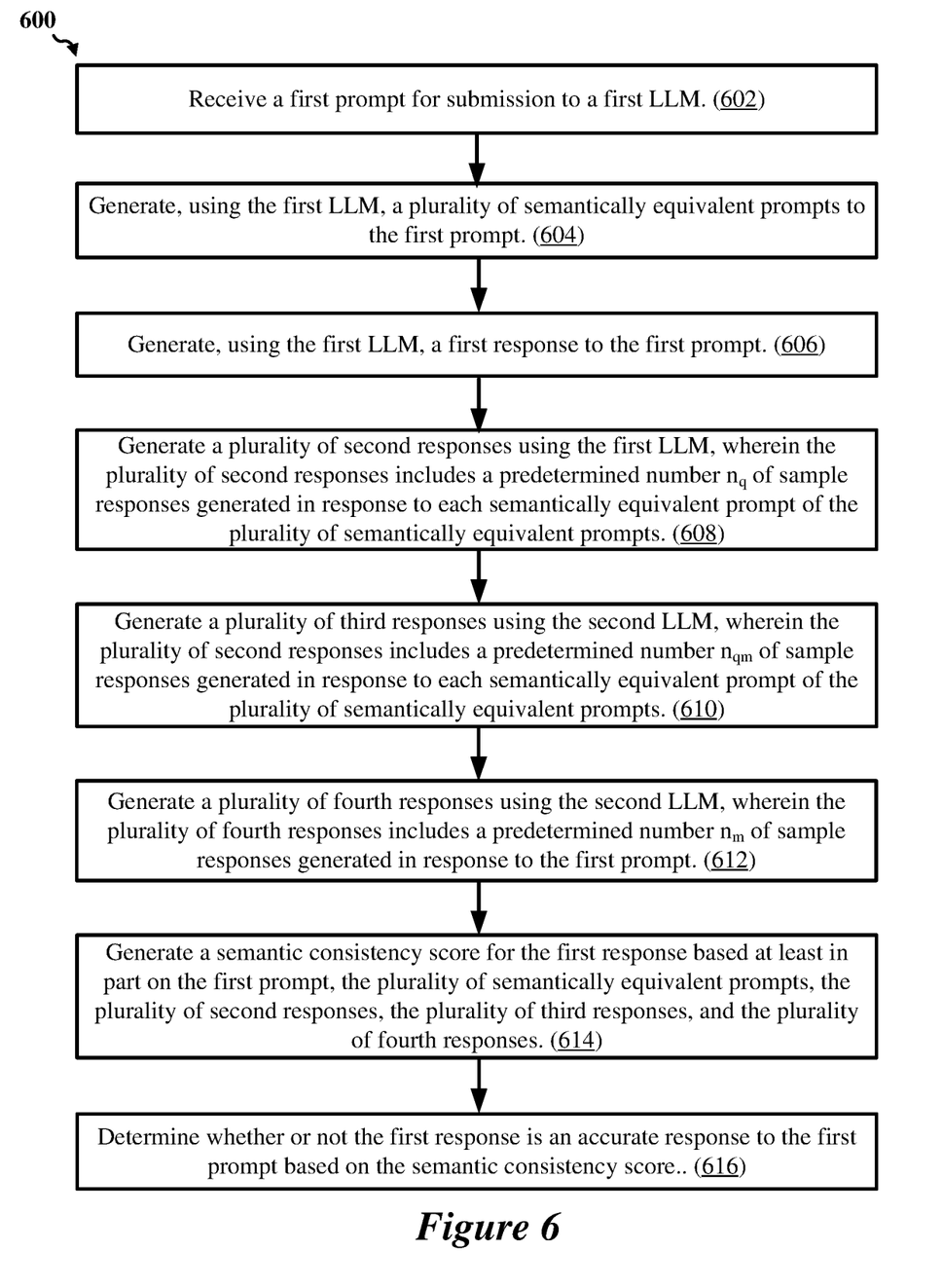
FIG. 6 shows an illustrative flow chart depicting an example operation for identifying hallucinations in responses generated by a first large language model (LLM), according to some implementations.

FIG. 6 shows an illustrative flow chart depicting an example operation 600 for identifying hallucinations in responses generated by a first large language model (LLM), according to some implementations. The example operation 600 is described as being performed by the system 300 depicted in FIG. 3 with reference to the components depicted in FIGS. 2 and 3 for clarity only, and the operation 600 may be performed by any suitable device or system including or coupled to two LLMs.

At block 602, the system 300 receives a first prompt for submission to a first LLM. In some aspects, a means for receiving the first prompt may include the interface 310.

At block 604, the system 300 generates, using the first LLM, a plurality of semantically equivalent prompts to the first prompt. In some aspects, a means for generating the plurality of semantically equivalent prompts may include the semantically equivalent prompt generation module 210 or the equivalent prompt engine 350 and the generative AI models 340 and interface 310 of FIG. 3.

At block 606, the system 300 generates, using the first LLM, a first response to the first prompt. In some aspects, a means for generating the first response includes the generative AI models 340 and the interface 310.

At block 608, the system 300 generates a plurality of second responses using the first LLM, wherein the plurality of second responses includes a predetermined number $n_q$ of sample responses generated in response to each semantically equivalent prompt of the plurality of semantically equivalent prompts. A means for generating the plurality of second responses may include the first LLM 220 of FIG. 2, or the generative AI models 340 and interface 310 of FIG. 3.

At block 610, the system 300 generates a plurality of third responses using the second LLM, wherein the plurality of second responses includes a predetermined number $n_{qm}$ of sample responses generated in response to each semantically equivalent prompt of the plurality of semantically equivalent prompts. A means for generating the plurality of third responses may include the second LLM 230 of FIG. 2, or the generative AI models 340 and interface 310 of FIG. 3.

At block 612, the system 300 generates a plurality of fourth responses using the second LLM, wherein the plurality of fourth responses includes a predetermined number $n_m$ of sample responses generated in response to the first prompt. A means for generating the plurality of fourth responses may include the second LLM 230 of FIG. 2, or the generative AI models 340 and interface 310 of FIG. 3.

At block 614, the system 300 generates a semantic consistency score for the first response based at least in part on the first prompt, the plurality of semantically equivalent prompts, the plurality of second responses, the plurality of third responses, and the plurality of fourth responses. A means for generating the semantic consistency score includes the semantically aware cross-check module 240 of FIG. 2 or the semantic consistency engine 360 and interface 310 of FIG. 3.

At block 616, the system 300 determines whether or not the first response is an accurate response to the first prompt based at least in part on the semantic consistency score. A means for determining whether or not the first response is an accurate response includes the semantically aware cross-check module 240 of FIG. 2 or the semantic consistency engine 360 and interface 310 of FIG. 3.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for identifying hallucinations in responses generated by a first large language model (LLM), the method performed by a computing device coupled to the first LLM and comprising:
   receiving a first prompt for submission to the first LLM;
   generating, using the first LLM, a plurality of semantically equivalent prompts to the first prompt;
   generating, using the first LLM, a first response to the first prompt;
   generating a plurality of second responses using the first LLM, each second response generated in response to a semantically equivalent prompt of the plurality of semantically equivalent prompts;
   generating a plurality of third responses using a second LLM different from the first LLM, each third response generated in response to a semantically equivalent prompt of the plurality of semantically equivalent prompts;
   generating a semantic consistency score for the first response based at least in part on the first prompt, the plurality of semantically equivalent prompts, the plurality of second responses, and the plurality of third responses; and
   determining whether or not the first response is an accurate response to the first prompt based at least in part on the semantic consistency score.

2. The method of claim 1, wherein generating the plurality of semantically equivalent prompts comprises:
   prompting the first LLM to generate a plurality of second prompts which are semantically equivalent to the first prompt;
   determining, using the first LLM, whether or not each second prompt of the plurality of second prompts is semantically equivalent to the first prompt; and
   generating the plurality of semantically equivalent prompts to include only the second prompts determined to be semantically equivalent to the first prompt.

3. The method of claim 1, further comprising parsing the first prompt, first response, the plurality of semantically equivalent prompts, the plurality of second responses and the plurality of third responses into a plurality of prompt-response pairs, each prompt-response pair including a prompt and a response generated in response to that prompt, wherein the semantic consistency score is further generated based at least in part on the plurality of prompt-response pairs.

4. The method of claim 3, wherein the plurality of prompt-response pairs comprises a first prompt-response pair including the first prompt and the first response, a plurality of second prompt-response pairs including the plurality of semantically equivalent prompts and corresponding second responses of the plurality of second responses, and a plurality of third prompt-response pairs including the plurality of semantically equivalent prompts and corresponding third responses of the plurality of third responses.

5. The method of claim 4, wherein generating a semantic consistency score comprises determining a question-level consistency score, determining a model-level cross-check consistency score, and determining a cross-model cross-question consistency score wherein the semantic consistency score is determined based at least in part on the question-level consistency score, the model-level cross-check consistency score, and the cross-model cross-question consistency score.

6. The method of claim 5, wherein the semantic consistency score comprises a weighted sum of the question-level consistency score, the model-level cross-check consistency score, and the cross-model cross-question consistency score.

7. The method of claim 5, wherein the question-level consistency score, the model-level cross-check consistency score, and the cross-model cross-question consistency score are determined based at least in part on an operator $C(\bullet,\bullet)$ indicating whether or not two prompt-response pairs are semantically equivalent.

8. The method of claim 7, wherein the operator $C(\bullet,\bullet)$ is determined based on prompting the first LLM to generate a response indicating whether or not the two prompt-response pairs are semantically equivalent.

9. The method of claim 5, wherein the question-level consistency score is based at least in part on a predetermined number k of the plurality of semantically equivalent prompts, and on a predetermined number $n_q$ responses of the first LLM to each of the k semantically equivalent prompts.

10. The method of claim 9, wherein the question-level consistency score is determined as $$\frac{1}{k*n_q}\sum_{i=1}^{n_q}\sum_{j=1}^{k} C(P_0, P^i_{S_{Tj}}),$$

where $P_0$ is a prompt-response pair including the first prompt and the first response, $P_{S_{Tj}}^i$ is a prompt response pair including a j-th prompt of the predetermined number k of semantically equivalent prompts and an i-th sample response of the predetermined number $n_q$ of sample responses to the j-th prompt, and $C(\bullet, \bullet)$ is an operator indicating whether or not two prompt-response pairs are semantically equivalent.

11. The method of claim 5, wherein the model-level cross-check consistency score is based at least in part on a predetermined number $n_m$ of sample responses of the second LLM to the first prompt.

12. The method of claim 11, wherein the model-level cross-check consistency score is determined as $$\frac{1}{n_m}\sum_{i=1}^{n_m} C(P_0, P^i_{S_{V0}}),$$

where $P_0$ is a prompt-response pair including the first prompt and the first response, $P_{S_{V0}}^i$ is a prompt response pair including the first prompt and an i-th sample response of the predetermined number $n_m$ of sample responses of the second LLM to the first prompt, and $C(\bullet, \bullet)$ is an operator indicating whether or not two prompt-response pairs are semantically equivalent.

13. The method of claim 5, wherein the cross-model cross-question consistency score is based at least in part on a predetermined number k of the plurality of semantically equivalent prompts, and on a predetermined number $n_{qm}$ of sample responses of the second LLM to each of the k semantically equivalent prompts.

14. The method of claim 13, wherein the cross-model cross-question consistency score is determined as $$\frac{1}{k*n_{qm}}\sum_{i=1}^{n_{qm}}\sum_{j=1}^{k} C(P_0, P^i_{S_{Vj}}),$$

where $P_0$ is a prompt-response pair including the first prompt and the first response, $P_{S_{Vj}}^i$ is a prompt response pair including a j-th prompt of the predetermined number k of semantically equivalent prompts and an i-th sample response of the predetermined number $n_{qm}$ of sample responses to the j-th prompt, and $C(\bullet,\bullet)$ is an operator indicating whether or not two prompt-response pairs are semantically equivalent.

15. The method of claim 1, wherein determining whether or not the first response is an accurate response to the first prompt comprises determining that the first response is an accurate response to the first prompt in response to the semantic consistency score exceeding a predetermined threshold.

16. A system for identifying hallucinations in responses generated by a first large language model (LLM), the system comprising:
one or more processors; and
a memory storing instructions that, when executed by the one or more processors, causes the system to perform operations comprising:
receiving a first prompt for submission to the first LLM;
generating, using the first LLM, a plurality of semantically equivalent prompts to the first prompt;
generating, using the first LLM, a first response to the first prompt;
generating a plurality of second responses using the first LLM, each second response generated in response to a corresponding semantically equivalent prompt of the plurality of semantically equivalent prompts;
generating a plurality of third responses using a second LLM different from the first LLM, each third response generated in response to a corresponding semantically equivalent prompt of the plurality of semantically equivalent prompts;
parsing the first prompt, first response, the plurality of semantically equivalent prompts, the plurality of second responses and the plurality of third responses into a plurality of prompt-response pairs, each prompt-response pair including a prompt and a response generated in response to that prompt;

generating a semantic consistency score for the first response based at least in part on the plurality of prompt response pairs; and determining whether or not the first response is an accurate response to the first prompt based at least in part on the semantic consistency score.

17. The system of claim 16, wherein execution of the instructions for generating the plurality of semantically equivalent prompts causes the system to perform operations further comprising:

prompting the first LLM to generate a plurality of second prompts which are semantically equivalent to the first prompt;

determining, using the first LLM, whether or not each second prompt of the plurality of second prompts is semantically equivalent to the first prompt; and generating the plurality of semantically equivalent prompts to include only the second prompts determined to be semantically equivalent to the first prompt.

18. The system of claim 16, wherein the plurality of prompt-response pairs comprises a first prompt-response pair including the first prompt and the first response, a plurality of second prompt-response pairs including the plurality of semantically equivalent prompts and corresponding second responses of the plurality of second responses, and a plurality of third prompt-response pairs including the plurality of semantically equivalent prompts and corresponding third responses of the plurality of third responses.

19. The system of claim 18, wherein execution of the instructions for generating a semantic consistency score causes the system to perform operations further comprising determining a question-level consistency score, determining a model-level cross-check consistency score, and determining a cross-model cross-question consistency score wherein the semantic consistency score is determined based at least in part on the question-level consistency score, the model-level cross-check consistency score, and the cross-model cross-question consistency score.

20. A computer-implemented method for identifying hallucinations in responses generated by a first large language model (LLM), the method performed by a computing device coupled to the first LLM and comprising:

receiving a first prompt for submission to the first LLM;

generating, using the first LLM, a plurality of semantically equivalent prompts to the first prompt;

generating, using the first LLM, a first response to the first prompt;

generating a plurality of second responses using the first LLM, wherein the plurality of second responses includes a predetermined number $n_q$ sample responses generated in response to each semantically equivalent prompt of the plurality of semantically equivalent prompts;

generating a plurality of third responses using the second LLM, wherein the plurality of second responses includes a predetermined number $n_{qm}$ sample responses generated in response to each semantically equivalent prompt of the plurality of semantically equivalent prompts;

generating a plurality of fourth responses using the second LLM, wherein the plurality of fourth responses includes a predetermined number $n_m$ sample responses generated in response to the first prompt;

generating a semantic consistency score for the first response based at least in part on the first prompt, the plurality of semantically equivalent prompts, the plurality of second responses, the plurality of third responses, and the plurality of fourth responses; and determining whether or not the first response is an accurate response to the first prompt based at least in part on the semantic consistency score.

\* \* \* \* \*